(12) United States Patent
Hu et al.

(10) Patent No.: US 8,385,677 B2
(45) Date of Patent: Feb. 26, 2013

(54) METHOD AND ELECTRONIC DEVICE FOR REDUCING DIGITAL IMAGE NOISES

(75) Inventors: An Chi Hu, Taipei County (TW); Yan Chen Lu, Taipei County (TW)

(73) Assignee: Vatics Inc., Taipei County (TW)

( * ) Notice: Subject to any disclaimer, the term of this patent is extended or adjusted under 35 U.S.C. 154(b) by 348 days.

(21) Appl. No.: 12/914,477

(22) Filed: Oct. 28, 2010

(65) Prior Publication Data

US 2012/0027319 A1 Feb. 2, 2012

(30) Foreign Application Priority Data

Jul. 28, 2010 (TW) ................................ 99124992 A

(51) Int. Cl.
*G06K 9/40* (2006.01)
(52) U.S. Cl. ........................................ 382/261; 382/275
(58) Field of Classification Search .................. 382/260, 382/261, 275; 348/607, 618, 619
See application file for complete search history.

(56) References Cited

U.S. PATENT DOCUMENTS

| | | | |
|---|---|---|---|
| 6,226,050 B1 * | 5/2001 | Lee | ................................ 348/607 |
| 7,319,797 B2 * | 1/2008 | Hung | ............................. 382/260 |
| 2008/0019605 A1 * | 1/2008 | Yea et al. | ....................... 382/261 |

OTHER PUBLICATIONS

James C. Brailean, et al., Noise Reduction Filters for Dynamic Image Sequences: A Review, Proceedings of the IEEE, Sep. 1995, pp. 1272-1292, vol. 83, No. 9.
Alexei A. Efros, et al., Texture Synthesis by Non-parametric Sampling, IEEE International Conference on Computer Vision, Corfu, Greece, Sep. 1999.

* cited by examiner

*Primary Examiner* — Jon Chang
(74) *Attorney, Agent, or Firm* — Morris Manning & Martin LLP; Tim Tingkang Xia, Esq.

(57) ABSTRACT

A method and an electronic device for reducing digital image noises are described. The method includes the steps of sequentially selecting a pixel from a digital image, and setting the pixel as a target pixel; defining a first area, and setting at least two of the rest pixels surrounding the target pixel in the first area as adjacent pixels; setting a first weighted area; setting a second weighted area corresponding to the first weighted area; computing a weight of the adjacent pixel located at a center position of the second weighted area by using a piecewise linear curve according to a similarity value of the first weighted area and the second weighted area; computing a weighted average of all the adjacent pixels and the target pixel, to determine a new value of the target pixel; and performing the above steps repeatedly, till all the pixels are processed.

32 Claims, 7 Drawing Sheets

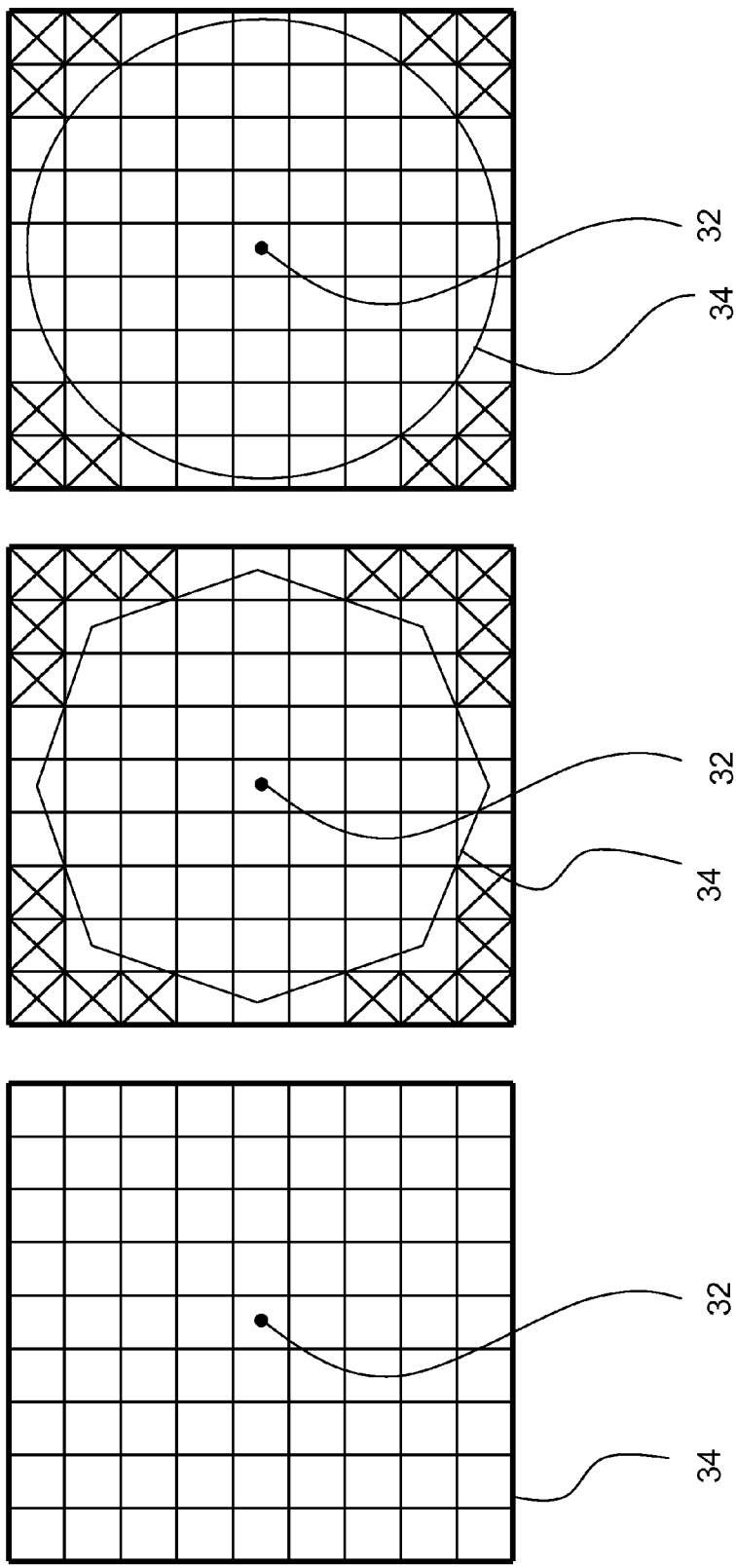

METHOD AND ELECTRONIC DEVICE FOR REDUCING DIGITAL IMAGE NOISES

CROSS-REFERENCE TO RELATED APPLICATIONS

This non-provisional application claims priority under 35 U.S.C. §119(a) on Patent Application No(s). 099124992 filed in Taiwan, R.O.C. on Jul. 28, 2010, the entire contents of which are hereby incorporated by reference.

BACKGROUND OF THE INVENTION

1. Field of Invention

The present invention relates to a method and an electronic device for processing a digital image, and more particularly to a method and an electronic device for reducing digital image noises.

2. Related Art

In recent years, with significant development of digital technology and development of Internet and multimedia technologies, many images need to be converted into digital images for processing. The mode of directly capturing a real scene by using a digital camera, or capturing an image from a document or picture by using an optical scanner and then converting the image into digital image data for outputting has become a common method for obtaining digital images.

In order to meet requirements on image quality of users, various digital image processing techniques are developed to improve the quality of the digital images.

Among the image processing techniques, noise reduction and edge enhancement are quite important. As the high-frequency part in a signal is always weakened when an image is coded/compressed, image edges or other image details of the coded/compressed image are lost. However, the image processing method of noise reduction generally causes image blurring; while, on the contrary, the image processing method of edge enhancement generally leads to enhancement of undesired noises. It is difficult for the two image processing methods to reach a compromise.

Conventionally, noise reduction can be realized by averaging, suppression, blurring, or other means. However, as described above, the conventional methods fail to achieve balance between noise reduction and maintaining of image details. Therefore, the method of using a curve of an exponential function as the basis of noise reduction is introduced, which can achieve good balance between the two image processing methods.

However, the computation of reducing the image noises by using the exponential function is of high complexity, thus resulting in a low processing speed and excessively large consumption of computation resources. Besides, a large number of (possibly exceeding 100) multipliers and many adders/subtractors are required by the exponential function. The multipliers are of a high cost and occupy a large circuit space, so that the overall hardware cost is increased. In addition, in this method, an exponential function table is also needed to assist the computation, which further occupies the valuable memory space and again raises the cost.

SUMMARY OF THE INVENTION

In order to solve the problems in the prior art that it is difficult to achieve good balance between noise reduction and maintaining of image details, the computation is too complicated, the processing speed is low, and the cost of hardware is high, the present invention is a method and an electronic device for reducing digital image noises; which are applied to process image noises of a plurality of pixels in a digital image. The electronic device for reducing digital image noises comprises a storage device, for storing the digital image having pixels, and a processor, for performing the method for reducing digital image noises.

In an embodiment, the method for reducing digital image noises comprises: sequentially selecting one of the pixel from the pixels of the digital image, and setting the pixel as a target pixel; defining a first area, in which the target pixel is located at a center of the first area, and setting at least two of the rest pixels surrounding the target pixel in the first area as a plurality of adjacent pixels; setting a first weighted area, in which the target pixel is located at a center of the first weighted area; setting a second weighted area, in which one of the adjacent pixels is located at a center of the second weighted area, and the second weighted area is corresponding to the first weighted area (that is to say, the second weighted area may have the same size as the first weighted area); computing a weight of the adjacent pixel at the center of the second weighted area by using a piecewise linear curve according to a similarity value of the first weighted area and the second weighted area; computing a weighted average of all the adjacent pixels and the target pixel, and deciding a new value of the target pixel according to the weighted average; and performing the above steps repeatedly, till all the pixels in the digital image are processed.

The step of "computing a weight of the adjacent pixel at the center of the second weighted area by using a piecewise linear curve according to a similarity value of the first weighted area and the second weighted area" comprises: computing the similarity value of the target pixel and the adjacent pixel at the center of the second weighted area according to the first weighted area and the second weighted area; and computing the weight of the adjacent pixel according to the similarity value and the piecewise linear curve. The step of "computing the similarity value of the target pixel and the adjacent pixel at the center of the second weighted area according to the first weighted area and the second weighted area" comprises: individually computing a difference diff of two of the pixels corresponding to the same relative position in the first weighted area and the second weighted area; and computing the similarity value by using Formula (1)

$$\frac{\sum |\mathit{diff}|}{w \times h},$$

where w is a square root of the number of the pixels located in the first weighted area, and h is a noise intensity parameter. When computing the weighted average, a maximum value of the weights of the adjacent pixels is taken as the weight of the target pixel.

In another embodiment, the method for reducing digital image noises is applied to process a first digital image and a consecutive second digital image, in which the first digital image is the aforementioned digital image. That is, the first digital image comprises the target pixel, the adjacent pixels, the first area, the first weighted area, and the second weighted area.

The method for reducing digital image noises may comprise: sequentially selecting one of the pixel from the pixels of the first digital image, and setting the pixel as the target pixel; defining the first area in the first digital image, in which the target pixel is located at the center of the first area, and setting at least two of the rest pixels surrounding the target pixel in the first area as the adjacent pixels; setting a second area in the second digital image, and setting at least one of the pixels in the second area as the adjacent pixel; setting the first weighted area in the first digital image, in which the target pixel is located at the center of the first weighted area; setting the second weighted area in the first digital image, in which one of the adjacent pixels is located at the center of the second weighted area, and the second weighted area is corresponding to the first weighted area; setting a third weighted area in the second digital image, in which the third weighted area has the same size and shape as the first weighted area, and the third weighted area is corresponding to the first weighted area; computing the weight of the adjacent pixel at the center of the second weighted area by using the piecewise linear curve according to the similarity value of the first weighted area and the second weighted area; computing the weight of the adjacent pixel at a center of the third weighted area by using the piecewise linear curve according to the similarity value of the first weighted area and the third weighted area; computing the weighted average of all the adjacent pixels and the target pixel, and deciding the new value of the target pixel according to the weighted average; and performing the above steps repeatedly, till all the pixels in the first digital image are processed.

The relative position of the second area in the second digital image may be the same as that of the first area in the first digital image. It should be noted that, in order to reduce the amount of computation, maybe only a part of the pixels in the second area are selected as the adjacent pixels and used for computing the new value. In order to obtain a better noise reduction effect, all the pixels except for the target pixel in the first area or the second area may be selected as the adjacent pixels.

In an aspect of the present invention, the piecewise linear curve comprises at least one segment of a linear curve. In an embodiment of the present invention, a slope of the segment of the linear curve is $-2^{-n}$, and n is a positive integer. In another embodiment of the present invention, the piecewise linear curve is a curve simulating an exponential function with a base number of 0 to 1.

In an aspect of the present invention, the first area and the second area may be a regular polygon or a circle.

In view of the above, according to the method and the electronic device for reducing digital image noises, the weighted value of the adjacent pixel is computed by using the piecewise linear curve simulating an exponential function curve, and the weighted value is further adopted to compute the new value of the target pixel, thus achieving good balance between noise reduction and maintaining of image details. Moreover, the complexity of computing the weight by using the piecewise linear curve is much lower than the conventional method of using an exponential function, so that the advantages of rapid processing and low-cost hardware are achieved.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein:

FIG. 4A is a schematic view of a first area according to an embodiment of the present invention;

FIG. 4B is a schematic view of a first area according to another embodiment of the present invention;

FIG. 4C is a schematic view of a first area according to still another embodiment of the present invention;

DETAILED DESCRIPTION OF THE INVENTION

The detailed features and advantages of the present invention are described below in great detail through the following embodiments, and the content of the detailed description is sufficient for persons skilled in the art to understand the technical content of the present invention and to implement the present invention there accordingly. Based upon the content of the specification, the claims, and the drawings, persons skilled in the art can easily understand the relevant objectives and advantages of the present invention.

Figure 1:
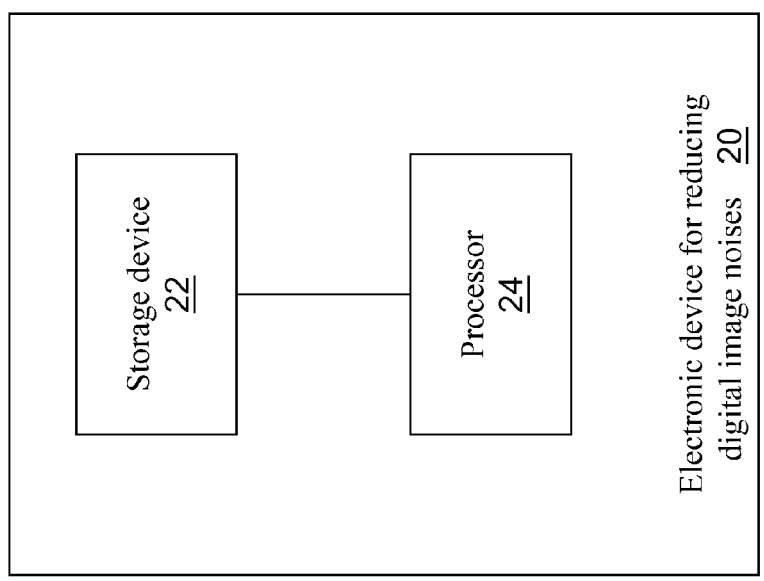
FIG. 1 is a functional block diagram of an electronic device for reducing digital image noises according to an embodiment of the present invention.

FIG. 1 is a functional block diagram of an embodiment of an electronic device 20 for reducing digital image noises (hereinafter, referred to as an electronic device for short). The electronic device 20 at least comprises a storage device 22 and a processor 24. The storage device 22 is used to store a digital image to be processed, and the processor 24 is used to perform the method of the present invention. The electronic device 20 may be specified as, for example, a personal computer, notebook computer, server, digital camera, monitoring video camera, mobile phone, or personal digital assistant (PDA). The electronic device 20 may be further implemented as an image capturing device (not shown), which comprises a charged coupled device (CCD) image pick-up device or a complementary metal oxide semiconductor (CMOS) image pick-up device for acquiring a still digital image or a digital video containing multiple frames.

Figure 3:
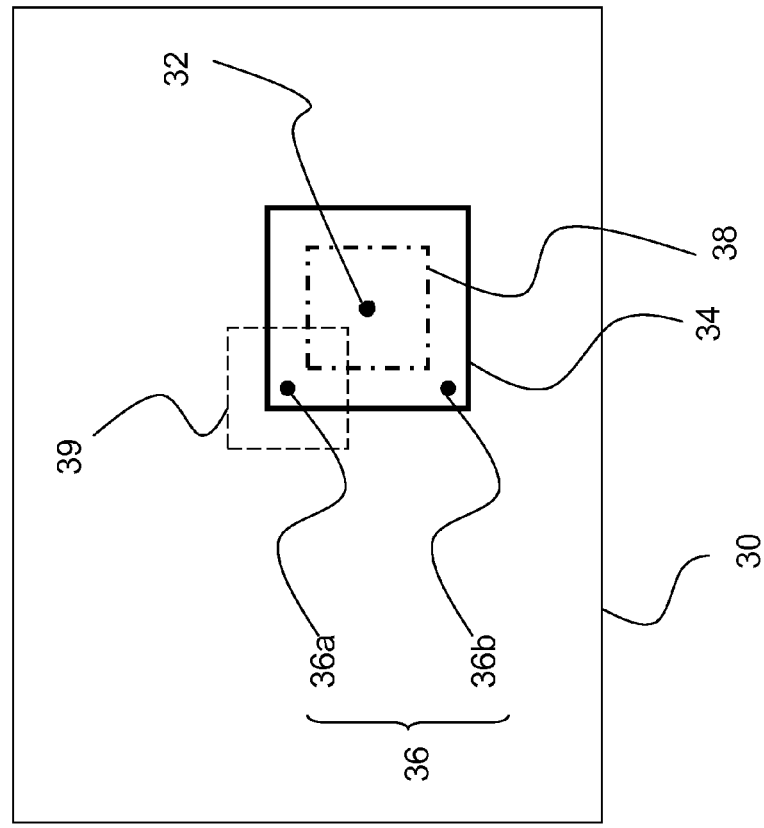
FIG. 3 is a schematic view of a digital image according to an embodiment of the present invention.
Figure 2:
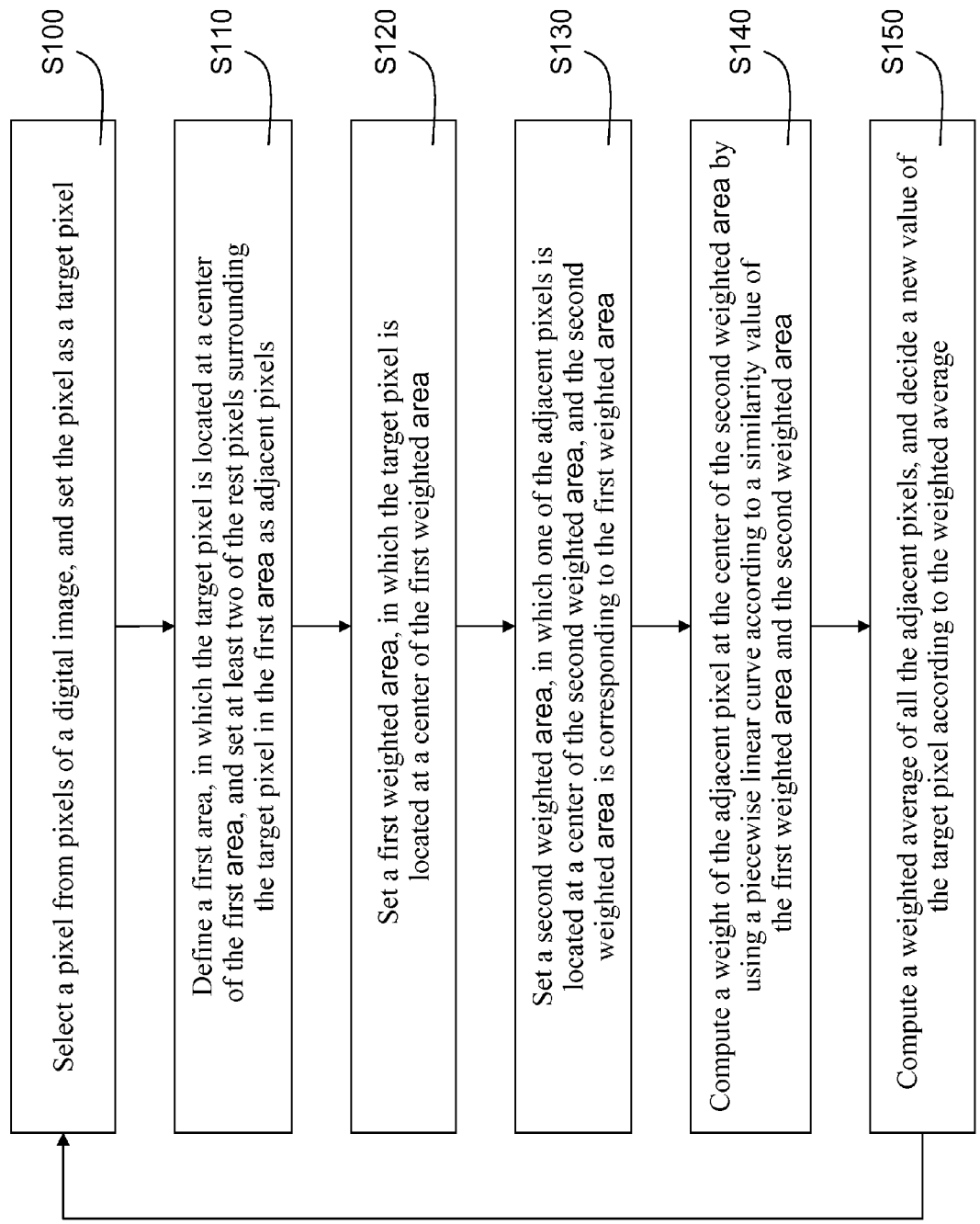
FIG. 2 is a flow chart of a method for reducing digital image noises according to an embodiment of the present invention.

FIG. 2 is a flow chart of a method for reducing digital image noises according to an embodiment of the present invention, and FIG. 3 is a schematic view of a digital image according to an embodiment of the present invention.

Referring to FIGS. 2 and 3, after a digital image 30 is obtained, a pixel is sequentially selected from pixels of the digital image 30, and is set as a target pixel 32 (Step S100). A first area 34 is defined, in which the target pixel 32 is located at a center position of the first area 34; and the processor 24 sets at least two of the rest pixels surrounding the target pixel 32 in the first area 34 as a plurality of adjacent pixels 36 (Step S110).

FIGS. 4A, 4B, and 4C are schematic views of the first area according to different embodiments of the present invention, in which the first area 34 may be a regular polygon or a circle. In the embodiments of FIGS. 4A, 4B, and 4C, the first area 34 is a regular tetragon (square), a regular octagon, and a circle with an outer frame range of 9×9 pixels, respectively. In the first area 34, the other pixels except for the target pixel 32 may be set as the adjacent pixels 36, for example, the adjacent pixel 36a or the adjacent pixel 36b.

Compared with the square first area 34, the distance of the pixels at an edge of the first area 34 of a circle, or a regular polygon close to a circle to the target pixel 32, is substantially the same. Therefore, when performing the processing method of reducing noises of the target pixel 32, the adjacent pixels 36 in the first area 34 of a circle, or a regular polygon close to a circle, have high reference value. However, the method for reducing digital image noises of the present invention does not limit the size or shape of the first area 34, that is, the outer frame range of the first area 34 may be of other sizes or shapes.

Next, a first weighted area 38 is set, in which the target pixel 32 is located at a center of the first weighted area 38 (Step S120). Preferably, the first weighted area 38 is smaller than the first area 34; but the size of the first weighted area 38 may also be equal to or larger than that of the first area 34. A second weighted area 39 is set, in which an adjacent pixel 36a of the adjacent pixels 36 is located at a center of the second weighted area 39, and the second weighted area 39 is corresponding to the first weighted area 38 (Step S130). That is, the processor 24 sets the second weighted area 39 with one of the adjacent pixels 36 (that is, the adjacent pixel 36a) as the center. The second weighted area 39 may have the same shape and size as the first weighted area 38. Therefore, the second weighted area 39 may comprise the same number of pixels as the first weighted area 38, and the pixels are located at corresponding positions.

In an embodiment of the method for reducing digital image noises of the present invention, the shape and size of the first weighted area 38 and the second weighted area 39 are also not limited.

According to a similarity value of the first weighted area 38 and the second weighted area 39, a weight of the adjacent pixel 36a at the center of the second weighted area 39 is computed by using a piecewise linear curve (Step S140).

Step S140 may comprise: computing the similarity value of the target pixel 32 and the adjacent pixel 36a at the center of the second weighted area 39, according to the first weighted area 38 and the second weighted area 39; and computing the weight of the adjacent pixel 36a, according to the similarity value and the piecewise linear curve. Step S140 may further comprise: individually computing a difference diff of two of the pixels corresponding to the same position in the first weighted area 38 and the second weighted area 39; and computing the similarity value by using Formula (1):

$$\frac{\sum |diff|}{w \times h} \quad \text{Formula (1)}$$

The second weighted area 39 and the first weighted area 38 comprise the same number of pixels, and the pixels are located at corresponding positions. The difference diff of the pixels corresponding to the same relative position in the second weighted area 39 and the first weighted area 38 is computed. The differences diff of all the pixels in the second weighted area 39 are accumulated, and then divided by w×h, to get the similarity value of the second weighted area 39 and the first weighted area 38. Herein, w is a square root of the number of the pixels located in the first weighted area 38. Taking the first weighted area 38 of 5×5 pixels as an example, w is 5. And, h is a noise intensity parameter, and is provided for the user to adjust the noise reduction effect. For example, in the digital image 30 with general noise intensity, the value of h is set to be 10 to 12 to achieve a desired effect. If the noises in the digital image 30 are too strong or too weak, the value of h can be adjusted up or down accordingly.

Figures 5A, 5B, 5C:
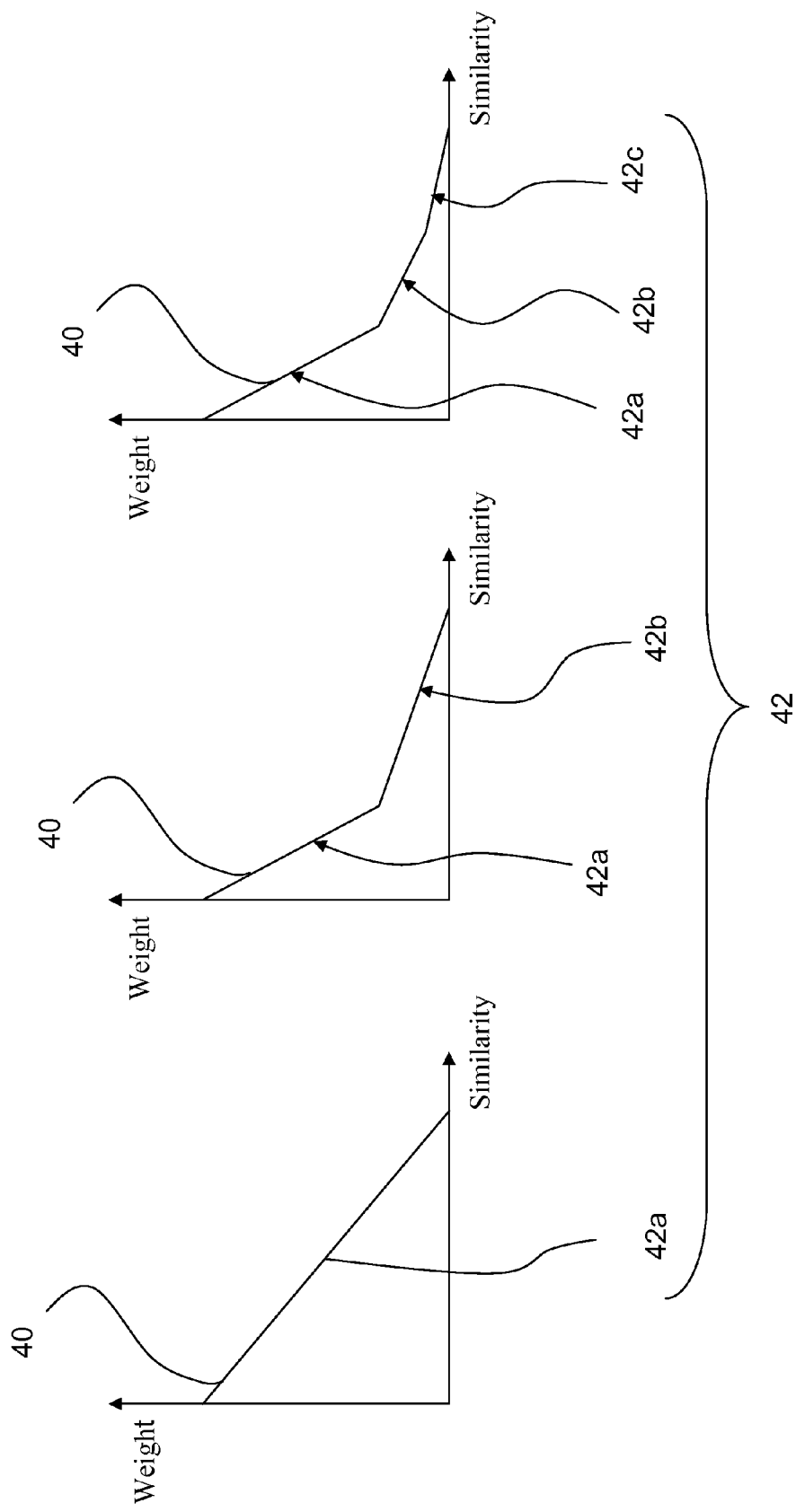
FIG. 5A is a schematic view of a piecewise linear curve according to an embodiment of the present invention.
FIG. 5B is a schematic view of a piecewise linear curve according to another embodiment of the present invention.
FIG. 5C is a schematic view of a piecewise linear curve according to still another embodiment of the present invention.

After the similarity value of the target pixel 32 and the adjacent pixel 36a at the center of the second weighted area 39 is obtained, the similarity value is substituted into the piecewise linear curve, to compute the weight of the adjacent pixel 36a at the center of the second weighted area 39. FIGS. 5A, 5B, and 5C are schematic views of the piecewise linear curve according to different embodiments of the present invention. The piecewise linear curve 40 comprises at least one segment 42 of a linear curve, for example, the piecewise linear curve 40 in FIG. 5A only comprises a segment 42a of a linear curve, while the piecewise linear curve 40 in FIG. 5C comprises segments 42a, 42b, and 43c of a linear curve.

Figure 6:
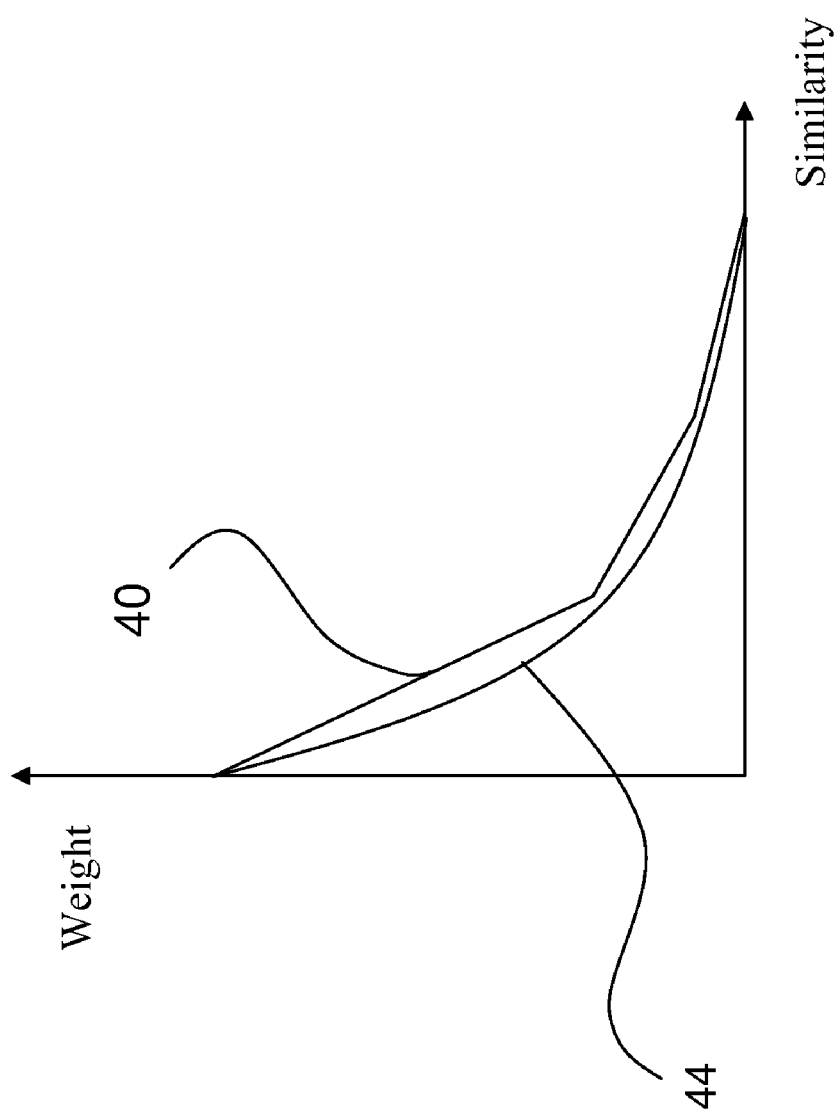
FIG. 6 is a schematic view of a target curve according to an embodiment of the present invention.

The piecewise linear curve 40 is a curve simulating an exponential function with a base number of 0 to 1 (hereinafter, referred to as a target curve for short), for example, a curve of the function $y=10^{-x}=(1/10)^x$. The target curve to be simulated when reducing noises is selected according to the content of the digital image 30. FIG. 6 is a schematic view of a target curve according to an embodiment of the present invention. The piecewise linear curve 40 simulates the target curve 44; however, when computing by using the piecewise linear curve 40, only the linear function needs to be computed, while computing by using the target curve 44, the exponential function needs to be computed. Therefore, compared with the method that uses the target curve 44, the method for computing the weight by using the piecewise linear curve 40 has rather low computation complexity. That is to say, the computation of the weight by using the piecewise linear curve 40 can significantly improve the computing speed, and also save a large number of multipliers in the hardware.

As shown in FIG. 5C, different segments 42 of the linear curve in the same piecewise linear curve 40 have different slopes and different ranges of the similarity values. Preferably, the slope of the segment 42 of the linear curve is $-2^{-n}$, where n is a positive integer. In this manner, when computing the weight, a part of the multipliers may be replaced by shifting, and thus the computing time or the hardware cost is further reduced. If the piecewise linear curve 40 contains even more segments 42 of the linear curve, a longer time is needed for computing the weight. As a result, the target curve 44 is simulated more smoothly, and thus impulses or Gaussian source type noises can be effectively removed.

Different adjacent pixels 36 are repeatedly selected to set the corresponding second weighted area 39, and the weights of all the adjacent pixels 36 are computed with the method of Step S140. Next, a weighted average of all the adjacent pixels 36 and the target pixel 32 is computed, and a new value of the target pixel 32 is determined according to the weighted average (Step S150).

Further, when computing the weighted average, the maximum value of the weights of all the adjacent pixels 36 is taken as the weight of the target pixel 32. For example, when the first area 34 is a square of 9×9 pixels, the weighted average is obtained by multiplying the values of the target pixel 32 and 80 adjacent pixels 36 by the individual weight and then averaging the results, to get the new value of the target pixel 32.

Such the new value is obtained by using all the adjacent pixels 36 of the target pixel 32, and thus the noises originally contained in the target pixel 32 can be effectively reduced. Moreover, when computing the weight, the similarity value is computed according to all the pixels in the first weighted area 38 and the second weighted area 39. Therefore, by using the method for reducing digital image noises, sufficient information around the target pixel 32 can be figured out, and thus more image details are maintained. The edges or high-frequency parts of the image are still maintained after the noises are removed, so that the severe blurring effect will not occur.

Figure 7:
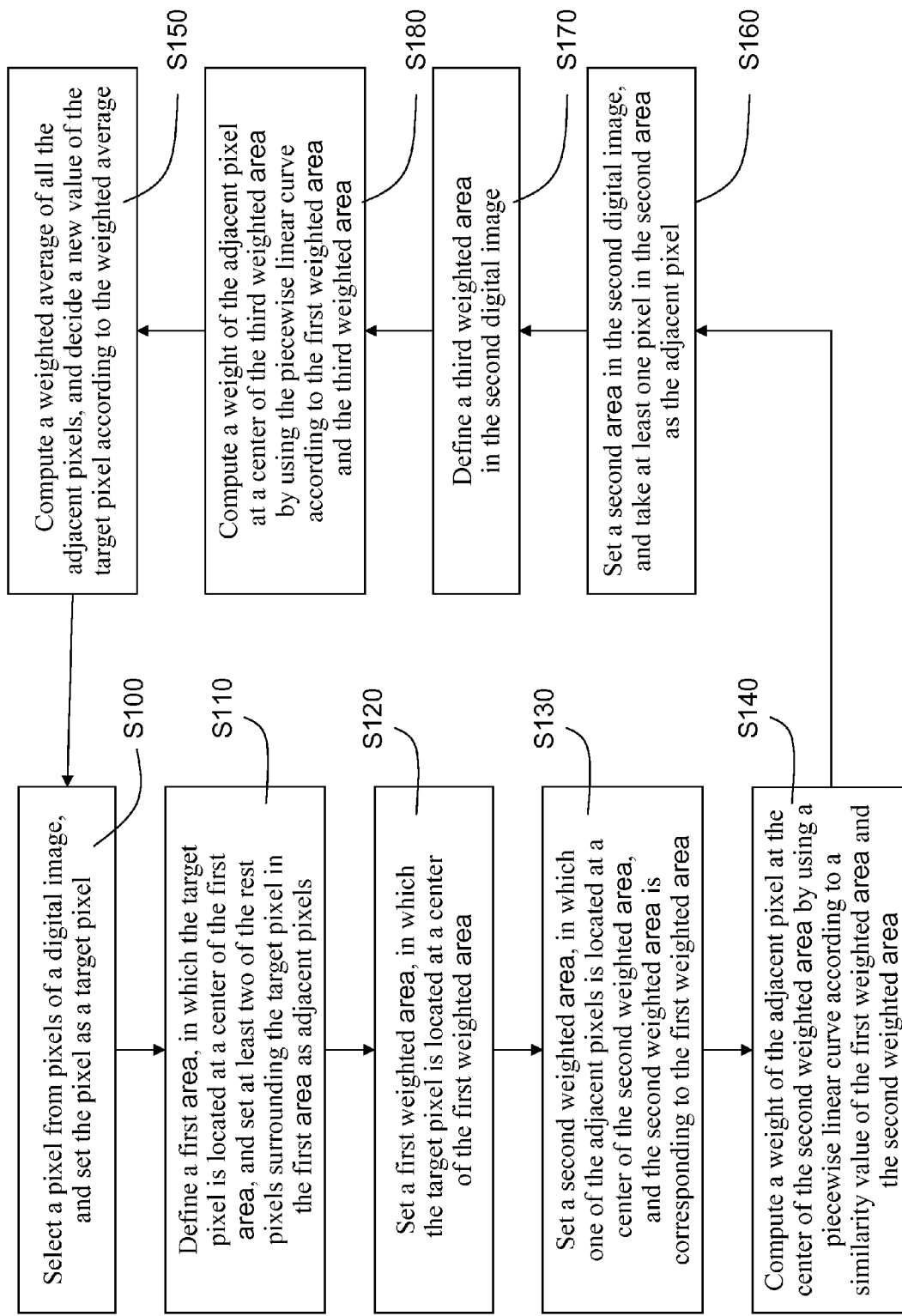
FIG. 7 is a flow chart of a method for reducing digital image noises according to another embodiment of the present invention.
Figure 8:
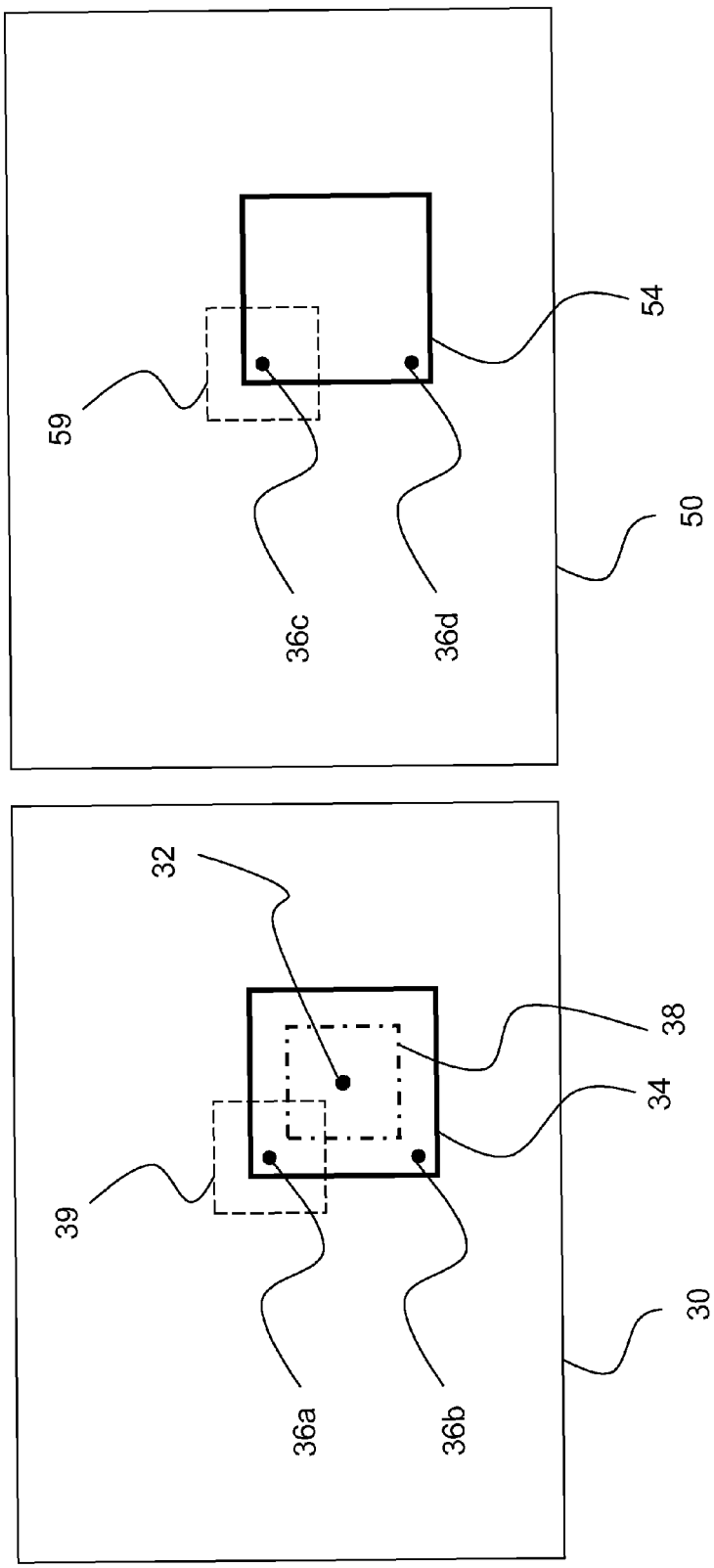
FIG. 8 is a schematic view of a first digital image and a second digital image according to an embodiment of the present invention.

According to an embodiment of the present invention, the method for reducing digital image noises may also be used to perform a 3D de-noising process. Referring to FIGS. 7 and 8, FIG. 7 shows steps of an embodiment of the method, and FIG. 8 shows a relative position relation of a first digital image and a second digital image of the method embodiment.

The method for reducing digital image noises is applied to process a first digital image 30 and a consecutive second digital image 50, in which the first digital image 30 is the aforementioned digital image 30. That is to say, the first digital image 30 comprises the target pixel 32, the first area 34, the adjacent pixels 36, the first weighted area 38, and the second weighted area 39. The first digital image 30 and the second digital image 50 may be, for example, two consecutive frames of a video, and may also be two still images of the same object consecutively shot by the user. For example, in a video, the second digital image 50 may be a frame preceding or following the first digital image 30. As the object to be shot is the same and the shooting time is close, the first digital image 30 and the second digital image 50 are sufficiently related to each other, and can be used together to reduce the noises of the first digital image 30.

In another embodiment, the first digital image 30 and the second digital image 50 are not consecutive. For example, other images may exist between the first digital image 30 and the second digital image 50. However, using the second digital image 50 which is consecutive to the first digital image 30 or is close to the first digital image 30 on the time axis may get a desired noise reduction effect. Additionally, besides the second digital image 50, a third digital image may also be adopted. Before Step S150, the processor 24 may also find other pixels in the second digital image 50 that can serve as the reference for the target pixel 32, and use the found pixels to compute the new value. The processor 24 sets a second area 54 in the second digital image 50, and takes at least one of the pixels in the second area 54 as the adjacent pixel 36 (Step S160). The position of the second area 54 in the second digital image 50 may be the same as that of the first area 34 in the first digital image 30. According to an embodiment of the present invention, the second area 54 may have the same size and shape as the first area 34. Taking the first area 34 and the second area 54 of 9×9 pixels as an example, besides the original 80 adjacent pixels 36 in the first area 34, 81 pixels in the second area 54 may also be set as the adjacent pixels 36 (for example, the adjacent pixel 36c or the adjacent pixel 36d).

The position of the second area 54 does not need to be the same as that of the first area 34. However, the pixels located in the second area 54 at the same or adjacent position of the first area 34 are similar to the target pixel 32, so that a desired noise reduction effect can be achieved. According to an embodiment of the present invention, maybe only a part of the pixels are selected in the second area 54 to serve as the adjacent pixels 36 and are used to compute the new value. By only selecting several important pixels in the second area 54 to serve as the adjacent pixels 36, the total amount of computation needed by noise reduction of the digital image 30 can be reduced. According to another embodiment of the present invention, in order to obtain a better noise reduction effect, all the pixels except for the target pixel 32 in the first area 34 or the second area 54 may be selected as the adjacent pixels 36.

Next, the processor 24 defines a third weighted area 59 in the second digital image 50 (Step S170). The third weighted area 59 may have the same size and shape as the first weighted area 38. Similar to Step S140, the processor 24 computes the weight of the adjacent pixel 36c at a center of the third weighted area 59 by using the piecewise linear curve 40 according to the similarity value of the first weighted area 38 and the third weighted area 59 (Step S180).

Thus, Step S150 further comprises computing the new value of the target pixel 32 according to all the adjacent pixels 36 located in the first digital image 30 and the second digital image 50 and the weights thereof. As more pixels are taken for reference in Steps S160, S170, S180, and S150, a more suitable new value of the target pixel 32 is obtained, thereby achieving a better noise reduction effect while maintaining more image details.

Step S160 may also be performed between Step S110 and Step S170; Step S170 may also be performed between Step S120 and Step S180; and Step S180 may also be performed between Step S170 and Step S150.

In view of the above, according to the method and the electronic device for reducing digital image noises, referring to the similarity value of the first weighted area and the second weighted area, the weighted values of the adjacent pixels are computed by using the piecewise linear curve simulating an exponential function curve, and then the weighted average of all the adjacent pixels is taken as the new value of the target pixel. Through the method, sufficient information about one target pixel can be obtained for compensation, so as to achieve better balance between noise reduction and maintaining of image details, as compared with the prior art. Moreover, the complexity of computing the weight by using the piecewise linear curve is much lower than the conventional method of using an exponential function, so that the speed of processing the digital image is significantly improved. In addition, the mode of computing the weight by using the piecewise linear curve may only need fewer than ten multipliers, and no additional exponential function table needs to be stored, so that the hardware cost is much lower than that of the prior art.

What is claimed is:

1. A method for reducing digital image noises, applied in an electronic computing device, to process image noises of a plurality of pixels in a digital image, the method comprising:

sequentially selecting one of the pixel from the pixels of the digital image, and setting the pixel as a target pixel;

defining a first area, wherein the target pixel is located at a center of the first area, and setting at least two of the rest pixels surrounding the target pixel in the first area as a plurality of adjacent pixels;

setting a first weighted area, wherein the target pixel is located at a center of the first weighted area;

setting a second weighted area, wherein one of the adjacent pixels is located at a center of the second weighted area, and the second weighted area is corresponding to the first weighted area;

computing a weight of the adjacent pixel at the center of the second weighted area by using a piecewise linear curve according to a similarity value of the first weighted area and the second weighted area;

computing a weighted average of all the adjacent pixels and the target pixel, and determining a new value of the target pixel according to the weighted average; and performing the above steps repeatedly, till all the pixels in the digital image are processed.

2. The method for reducing digital image noises according to claim 1, wherein the step of computing a weight of the adjacent pixel at the center of the second weighted area by using a piecewise linear curve according to a similarity value of the first weighted area and the second weighted area comprises:

computing the similarity value of the target pixel and the adjacent pixel at the center of the second weighted area according to the first weighted area and the second weighted area; and computing the weight of the adjacent pixel according to the similarity value and the piecewise linear curve.

3. The method for reducing digital image noises according to claim 2, wherein the step of computing the similarity value of the target pixel and the adjacent pixel at the center of the second weighted area according to the first weighted area and the second weighted area comprises:

individually computing a difference diff of two of the pixels corresponding to the same relative position in the first weighted area and the second weighted area; and computing the similarity value by using $$\frac{\sum |diff|}{w \times h},$$

where w is a square root of the number of the pixels located in the first weighted area, and h is a noise intensity parameter.

4. The method for reducing digital image noises according to claim 1, further comprising:

taking a maximum value of the weights of the adjacent pixels as the weight of the target pixel.

5. The method for reducing digital image noises according to claim 1, wherein the piecewise linear curve comprises at least one segment of a linear curve.

6. The method for reducing digital image noises according to claim 5, wherein a slope of the segment of the linear curve is $-2^{-n}$, and n is a positive integer.

7. The method for reducing digital image noises according to claim 1, wherein the piecewise linear curve is a curve simulating an exponential function with a base number of 0 to 1.

8. The method for reducing digital image noises according to claim 1, wherein the first area is a regular polygon or a circle.

9. The method for reducing digital image noises according to claim 8, wherein the first area is a regular octagon.

10. A method for reducing digital image noises, applied in an electronic computing device, to process image noises of a plurality of pixels in a first digital image and a consecutive second digital image, the method comprising:

sequentially selecting one of the pixel from the pixels of the first digital image, and setting the pixel as a target pixel;

defining a first area in the first digital image, wherein the target pixel is located at a center of the first area, and setting at least two of the rest pixels surrounding the target pixel in the first area as a plurality of adjacent pixels;

setting a second area in the second digital image, and setting at least one of the pixels in the second area as the adjacent pixel;

setting a first weighted area in the first digital image, wherein the target pixel is located at a center of the first weighted area;

setting a second weighted area in the first digital image, wherein one of the adjacent pixels is located at a center of the second weighted area, and the second weighted area is corresponding to the first weighted area;

setting a third weighted area in the second digital image, wherein the third weighted area in the second digital image has the same size and shape as the first weighted area in the first digital image;

computing a weight of the adjacent pixel at the center of the second weighted area by using a piecewise linear curve according to a similarity value of the first weighted area and the second weighted area;

computing the weight of the adjacent pixel at a center of the third weighted area by using the piecewise linear curve according to the similarity value of the first weighted area and the third weighted area;

computing a weighted average of all the adjacent pixels and the target pixel, and deciding a new value of the target pixel according to the weighted average; and performing the above steps repeatedly, till all the pixels in the first digital image are processed.

11. The method for reducing digital image noises according to claim 10, wherein a relative position of the second area in the second digital image is the same as that of the first area in the first digital image.

12. The method for reducing digital image noises according to claim 10, wherein the step of computing a weight of the adjacent pixel at the center of the second weighted area by using a piecewise linear curve according to a similarity value of the first weighted area and the second weighted area comprises:

computing the similarity value of the target pixel and the adjacent pixel at the center of the second weighted area according to the first weighted area and the second weighted area; and computing the weight of the adjacent pixel according to the similarity value and the piecewise linear curve.

13. The method for reducing digital image noises according to claim 12, wherein the step of computing the similarity value of the target pixel and the adjacent pixel at the center of the second weighted area according to the first weighted area and the second weighted area comprises:

individually computing a difference diff of two of the pixels corresponding to the same relative position in the first weighted area and the second weighted area; and computing the similarity value by using $$\frac{\sum |diff|}{w \times h},$$

where w is a square root of the number of the pixels located in the first weighted area, and h is a noise intensity parameter.

14. The method for reducing digital image noises according to claim 10, wherein the step of computing the weight of the adjacent pixel at the center of the third weighted area by using the piecewise linear curve according to the similarity value of the first weighted area and the third weighted area comprises:

computing the similarity value of the target pixel and the adjacent value at the center of the third weighted area according to the first weighted area and the third weighted area; and computing the weight of the adjacent pixel according to the similarity value and the piecewise linear curve.

15. The method for reducing digital image noises according to claim 14, wherein the step of computing the similarity value of the target pixel and the adjacent value at the center of the third weighted area according to the first weighted area and the third weighted area comprises:

individually computing a difference diff of two of the pixels corresponding to the same relative position in the first weighted area and the third weighted area; and computing the similarity value by using $$\frac{\sum |\mathit{diff}|}{w \times h},$$

where w is a square root of the number of the pixels located in the first weighted area, and h is a noise intensity parameter.

16. The method for reducing digital image noises according to claim 10, further comprising:

taking a maximum value of the weights of the adjacent pixels as the weight of the target pixel.

17. The method for reducing digital image noises according to claim 10, wherein the piecewise linear curve comprises at least one segment of a linear curve.

18. The method for reducing digital image noises according to claim 17, wherein a slope of the segment of the linear curve is $-2^{-n}$, and n is a positive integer.

19. The method for reducing digital image noises according to claim 10, wherein the piecewise linear curve is a curve simulating an exponential function with a base number of 0 to 1.

20. The method for reducing digital image noises according to claim 10, wherein the first area is a regular polygon or a circle.

21. The method for reducing digital image noises according to claim 20, wherein the first area is a regular octagon.

22. An electronic device for reducing digital image noises, applied to process image noises of a plurality of pixels in a digital image, the device comprising:

a storage device, for storing the digital image; and
a processor, for performing the following steps:
sequentially selecting one of the pixel from the pixels of the digital image, and setting the pixel as a target pixel;
defining a first area, wherein the target pixel is located at a center of the first area, and setting at least two of the rest pixels surrounding the target pixel in the first area as a plurality of adjacent pixels;
setting a first weighted area, wherein the target pixel is located at a center of the first weighted area;
setting a second weighted area, wherein one of the adjacent pixels is located at a center of the second weighted area, and the second weighted area is corresponding to the first weighted area;
computing a weight of the adjacent pixel at the center of the second weighted area by using a piecewise linear curve according to a similarity value of the first weighted area and the second weighted area;
computing a weighted average of all the adjacent pixels and the target pixel, and deciding a new value of the target pixel according to the weighted average; and performing the above steps repeatedly, till all the pixels in the digital image are processed.

23. The electronic device for reducing digital image noises according to claim 22, wherein the step of computing a weight of the adjacent pixel at the center of the second weighted area by using a piecewise linear curve according to a similarity value of the first weighted area and the second weighted area comprises:

computing the similarity value of the target pixel and the adjacent pixel at the center of the second weighted area according to the first weighted area and the second weighted area; and computing the weight of the adjacent pixel according to the similarity value and the piecewise linear curve.

24. The electronic device for reducing digital image noises according to claim 23, wherein the step of computing the similarity value of the target pixel and the adjacent pixel at the center of the second weighted area according to the first weighted area and the second weighted area further comprises:

individually computing a difference diff of two of the pixels corresponding to the same relative position in the first weighted area and the second weighted area; and
computing the similarity value by using $$\frac{\sum |\mathit{diff}|}{w \times h},$$

where w is a square root of the number of the pixels located in the first weighted area, and h is a noise intensity parameter.

25. The electronic device for reducing digital image noises according to claim 22, wherein the processor further performs the following step:

taking a maximum value of the weights of the adjacent pixels as the weight of the target pixel.

26. The electronic device for reducing digital image noises according to claim 22, wherein the piecewise linear curve comprises at least one segment of a linear curve.

27. The electronic device for reducing digital image noises according to claim 26, wherein a slope of the segment of the linear curve is $-2^{-n}$, and n is a positive integer.

28. The electronic device for reducing digital image noises according to claim 22, wherein the piecewise linear curve is a curve simulating an exponential function with a base number of 0 to 1.

29. The electronic device for reducing digital image noises according to claim 22, wherein the first area is a regular polygon or a circle.

30. The electronic device for reducing digital image noises according to claim 29, wherein the first area is a regular octagon.

31. The electronic device for reducing digital image noises according to claim 22, applied to process a first digital image and a consecutive second digital image, wherein the first digital image comprises the target pixel, the adjacent pixels, the first area, the first weighted area, and the second weighted area, wherein before computing the weighted average of all the adjacent pixels and the target pixel to serve as the new value of the target pixel, the processor further performs the following steps:

setting a second area in the second digital image, and taking at least one of the pixels in the second area as the adjacent pixel;

defining a third weighted area in the second digital image, wherein the third weighted area in the second digital image has the same size and shape as the first weighted area in the first digital image; and computing the weight of the adjacent pixel at a center of the third weighted area by using the piecewise linear curve according to the similarity value of the first weighted area and the third weighted area.

32. The electronic device for reducing digital image noises according to claim 31, wherein a relative position of the second area in the second digital image is the same as that of the first area in the first digital image.

* * * * *